United States Patent
Huang et al.

(10) Patent No.: US 10,665,255 B1
(45) Date of Patent: May 26, 2020

(54) DATA STORAGE DEVICE DISABLING SWINGING OF SPINDLE MOTOR SPEED BASED ON PES

(71) Applicant: Western Digital Technologies, Inc., San Jose, CA (US)

(72) Inventors: Peng Huang, Lake Forest, CA (US); Toshihisa Kiyonaga, San Jose, CA (US); Masahito Kobayashi, Ibaraki (JP); Hiroaki Sakuma, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/444,976

(22) Filed: Jun. 18, 2019

(51) Int. Cl.
*G11B 5/596* (2006.01)
*G05B 19/414* (2006.01)

(52) U.S. Cl.
CPC ........ *G11B 5/59627* (2013.01); *G05B 19/414* (2013.01); *G11B 5/59622* (2013.01); *G11B 5/59688* (2013.01); *G11B 5/59694* (2013.01)

(58) Field of Classification Search
USPC ........ 360/27–75, 77.03, 77.11, 78.04, 78.06, 360/78.09
See application file for complete search history.

(56) References Cited

U.S. PATENT DOCUMENTS

| | | | |
|---|---|---|---|
| 6,577,463 B1* | 6/2003 | Frees | G11B 5/59655 360/51 |
| 7,012,396 B1 | 3/2006 | Brenden et al. | |
| 7,400,466 B2 | 7/2008 | Lee et al. | |
| 8,649,121 B1 | 2/2014 | Smith et al. | |
| 8,665,552 B2* | 3/2014 | Fasen | G11B 5/584 360/77.01 |
| 8,953,271 B1* | 2/2015 | Chayarangkan | G11B 5/59627 360/55 |
| 2001/0028519 A1* | 10/2001 | Tan | G11B 21/106 360/31 |
| 2002/0006009 A1* | 1/2002 | Ooi | G11B 5/5582 360/77.07 |
| 2002/0041472 A1* | 4/2002 | Ding | G11B 5/5582 360/290 |
| 2004/0246618 A1* | 12/2004 | Ehrlich | G11B 5/59627 360/77.02 |
| 2006/0291087 A1* | 12/2006 | Suh | G11B 5/40 360/77.02 |
| 2009/0021864 A1* | 1/2009 | Chen | G11B 19/046 360/234.3 |
| 2010/0039733 A1* | 2/2010 | Liu | G11B 5/4813 360/265.6 |
| 2012/0002320 A1* | 1/2012 | Brown | G11B 25/043 360/97.13 |

* cited by examiner

*Primary Examiner* — Tan X Dinh

(57) ABSTRACT

A data storage device is disclosed comprising a disk comprising servo data, a spindle motor configured to rotate the disk, and a head actuated over the disk. A position error signal (PES) is generated based on the servo data, and the head is actuated over the disk based on the PES. While swinging a speed of the spindle motor, the swinging is disabled based on the PES.

19 Claims, 6 Drawing Sheets

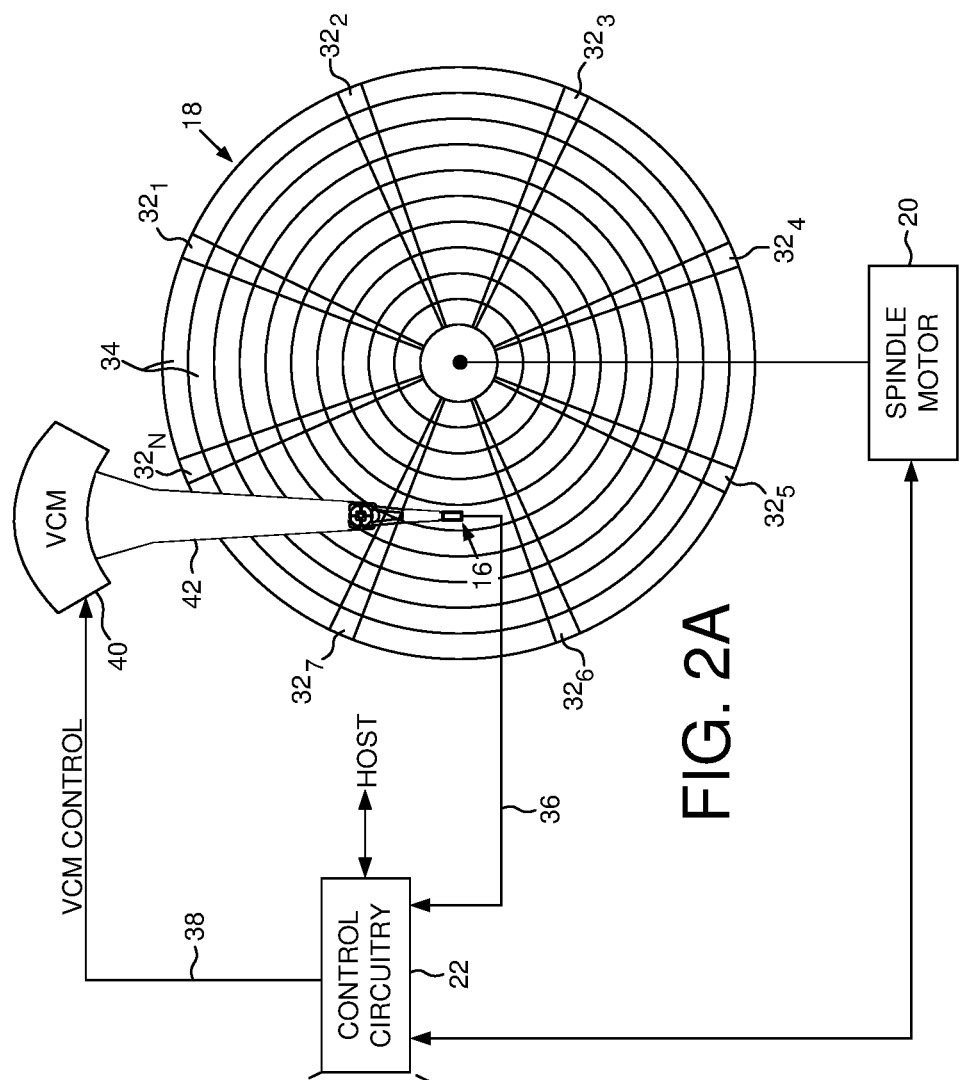

US 10,665,255 B1

DATA STORAGE DEVICE DISABLING SWINGING OF SPINDLE MOTOR SPEED BASED ON PES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk that is rotated by a spindle motor.

FIG. 2B is a flow diagram according to an embodiment wherein a swinging of the spindle motor speed is disabled based on a position error signal (PES) used to servo the head over the disk.

DETAILED DESCRIPTION

Figure 1:
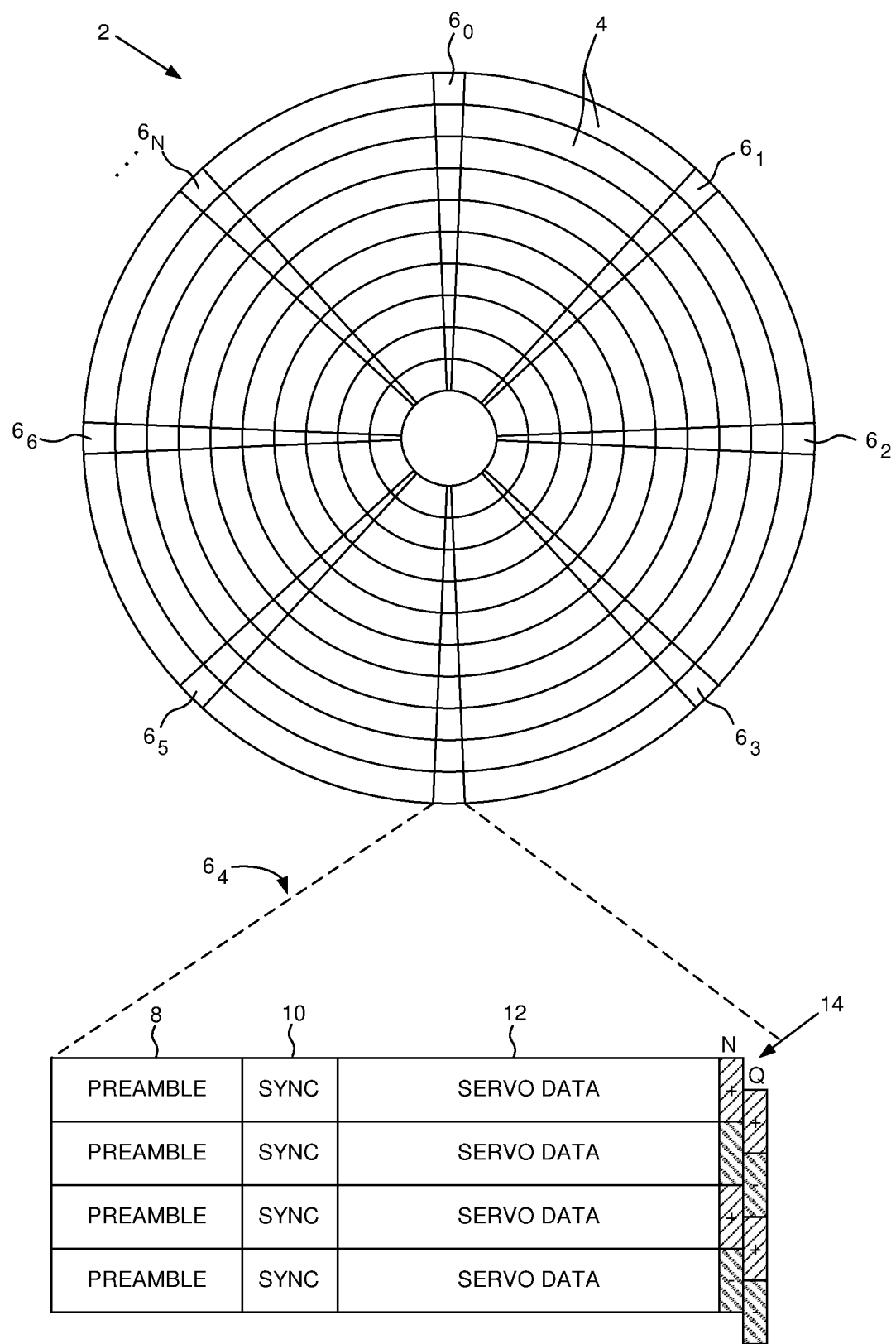
FIG. 1 shows a prior art disk format comprising a plurality of servo tracks defined by servo sectors.

FIG. 2A shows a data storage device in the form of a disk drive according to an embodiment comprising a head 16 actuated over a disk 18 that is rotated by a spindle motor 20, wherein the disk 18 comprises servo data (e.g., servo sectors). The disk drive further comprises control circuitry 22 configured to execute the flow diagram of FIG. 2B, wherein a position error signal (PES) is generated based on the servo data (block 24), and the head is actuated over the disk based on the PES (block 26). A swing of the spindle motor speed is enabled (block 28) and then disabled based on the PES (block 30).

In the embodiment of FIG. 2A, the disk 18 comprises a plurality of servo sectors $32_1$-$32_N$ that define a plurality of servo tracks, wherein data tracks 34 are defined relative to the servo tracks at the same or different radial density. The control circuitry 22 processes a read signal 36 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 38 applied to a VCM 40 which rotates an actuator arm 42 about a pivot in order to actuate the head radially over the disk surface in a direction that reduces the PES. In one embodiment, the head 16 may be actuated over the disk 18 based on the PES using one or more secondary actuators, for example, a microactuator that actuates a suspension coupling a head slider to the actuator arm 42, or a microactuator that actuates the head slider relative to the suspension (e.g., using a thermal actuator, piezoelectric actuator, etc.). The servo sectors $32_1$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
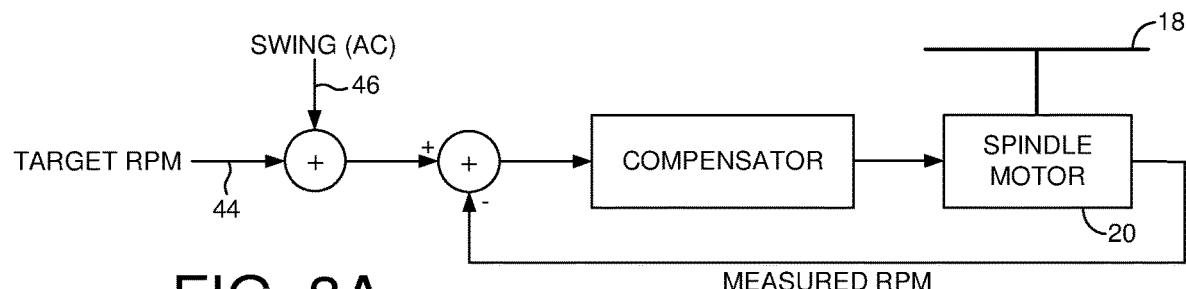
FIG. 3A shows a prior art closed loop servo system wherein a swing (AC) speed is added to a target speed in order to swing the spindle motor speed about a DC level.
Figure 3B:
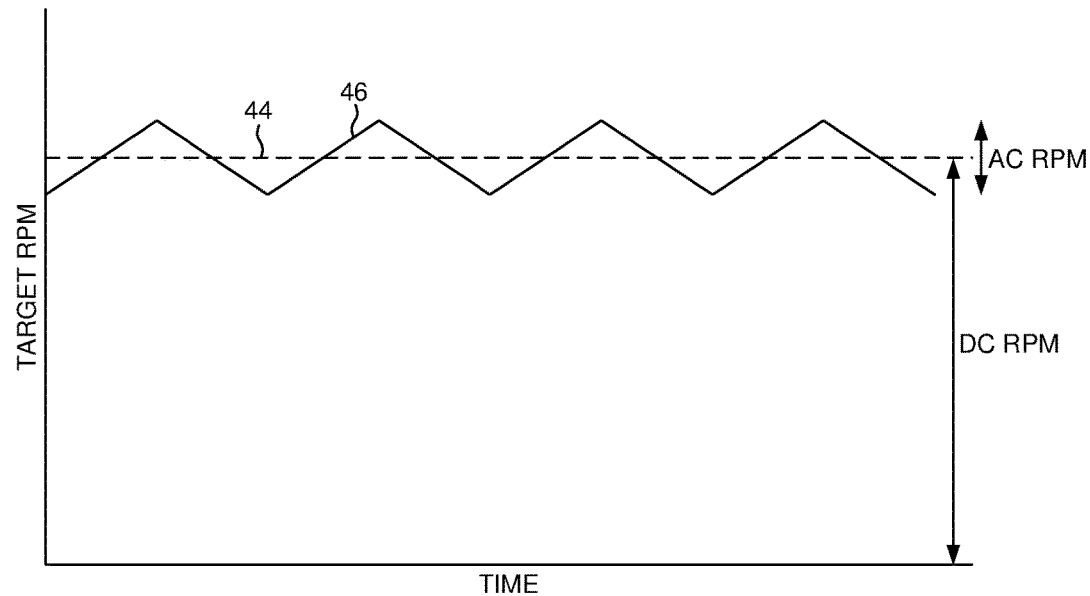
FIG. 3B shows a prior art swing (AC) speed in the form of a triangle wave.

The servo control system in the control circuitry 22 for maintaining the head 16 along the centerline of a data track during an access operation may be adversely affected by disturbances, such as repeatable runout (RRO) and non-repeatable runout (NRRO). RRO is a periodic disturbance that repeats at any given circumferential position of the head as the disk rotates. An example of RRO is a resonance mode of the spindle motor 20 which may induce a periodic wobble as the disk rotates. Mechanical modes of the spindle motor 20, such as imperfections in the bearings, may also induce a NRRO disturbance in the head's servo control system (i.e., a random disturbance that may be spread over a range of frequencies). FIG. 3A shows a prior art closed loop servo system for controlling the speed of the spindle motor 20 based on a target speed 44. In order to reduce the RRO disturbance affecting the head caused by a resonance mode of the spindle motor 20, a swing (AC) speed 46 is added to the DC target speed 44 so as to periodically swing the speed of the spindle motor 20 between a maximum and minimum speed. FIG. 3B shows an example of a swing (AC) speed 46 in the form of a triangle wave that swings between a maximum and minimum value at the peak and valley of the triangle wave. The amplitude of the swing (AC) speed 46 is typically very small, such as less than one percent of the DC target speed 44, and the frequency of the swing (AC) speed 46 is typically very low, such as 1 Hz relative to the rotation frequency of the disk. In this manner, the swing (AC) speed 46 may reduce a RRO disturbance affecting the head by spreading the resonance mode amplitudes across multiple frequencies without adversely affecting the access operations of the disk drive.

Swinging the speed of the spindle motor by adding a swing (AC) speed to a DC target speed as in the prior art closed loop servo system of FIG. 3A may magnify the NRRO disturbance affecting the head 16 due, for example, to changes in environmental conditions such as temperature, or changes to external disturbances (e.g., audio vibrations) that may affect a mechanical mode of the spindle motor 20. Accordingly, in one embodiment the PES generated by reading the servo data from the disk is monitored in order to detect when the NRRO affecting the head becomes excessive. When an excessive NRRO is detected, the swinging of the spindle speed is disabled, at least temporarily, so as to maintain the RRO and the NRRO within acceptable limits.

Figure 4A:
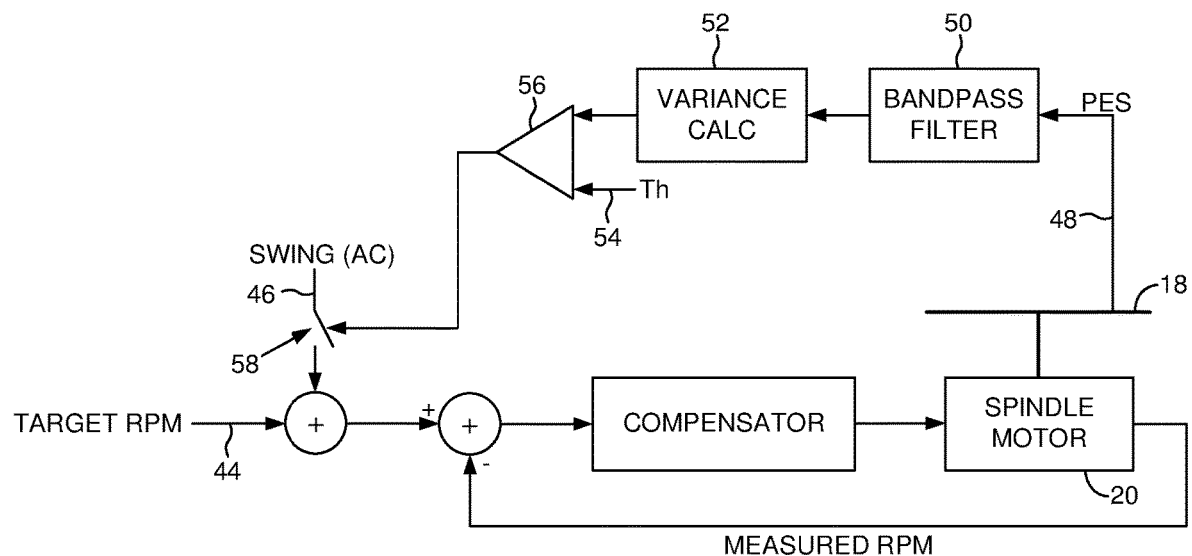
FIG. 4A shows a closed loop servo system according to an embodiment wherein the swing (AC) speed is disabled based on the PES used to servo the head over the disk.
Figure 4B:
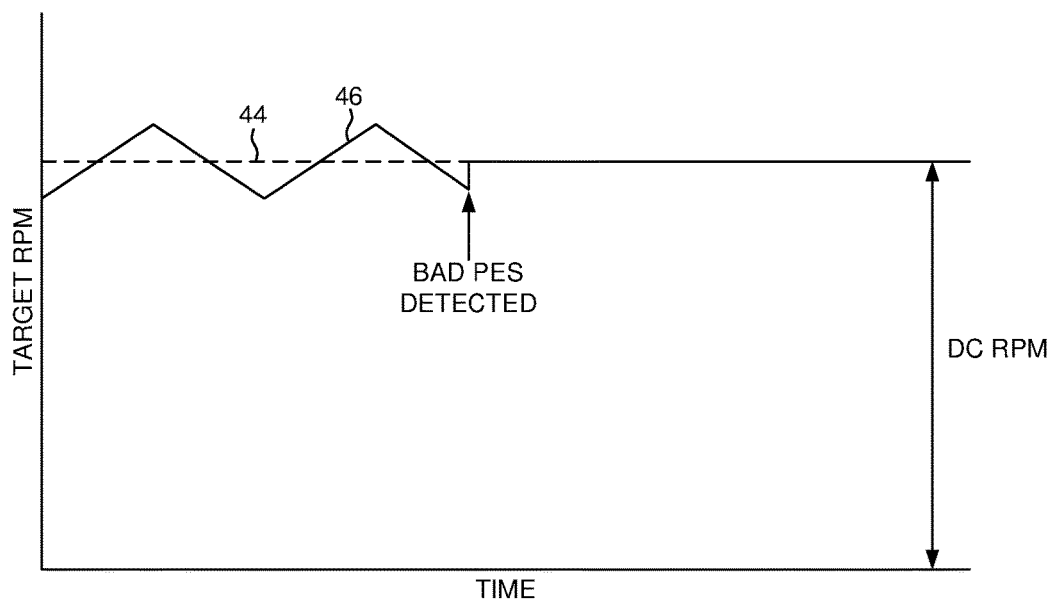
FIG. 4B shows an embodiment wherein when a bad PES disables the swing (AC) speed, the target speed is step adjusted to a DC level.

FIG. 4A shows an example of this embodiment wherein the swing (AC) speed 46 added to the DC target speed 44 is disabled based on the PES 48 generated from reading the servo data recorded on the disk 18 (e.g., the servo sectors $32_1$-$32_N$). In the embodiment of FIG. 4A, the PES 48 is filtered with a band-pass filter 50 in order to extract a frequency band of the PES that may better reflect the NRRO disturbances caused by the spindle motor (e.g., a frequency band that corresponds to spindle bearing imperfections) and to filter out other disturbances (e.g., external shocks to the disk drive) not caused by the spindle motor 20. A variance of the filtered PES is computed at block 52, and the variance of the filtered PES is compared to a threshold 54 at comparator 56. The comparator 56 disables the swing (AC) speed 46 (figuratively represented as opening switch 58) when the variance of the filtered PES exceeds the threshold 54. FIG. 4B shows an example of the swing (AC) speed 46 being disabled when a bad PES is detected, wherein in this embodiment the target speed of the spindle motor is step adjusted to the DC target speed 44. In an alternative embodiment, the target speed of the spindle motor may be ramped from the current target speed (DC+AC) to the target DC speed in order to avoid injecting a transient disturbance into the spindle motor control loop.

Figure 5A:
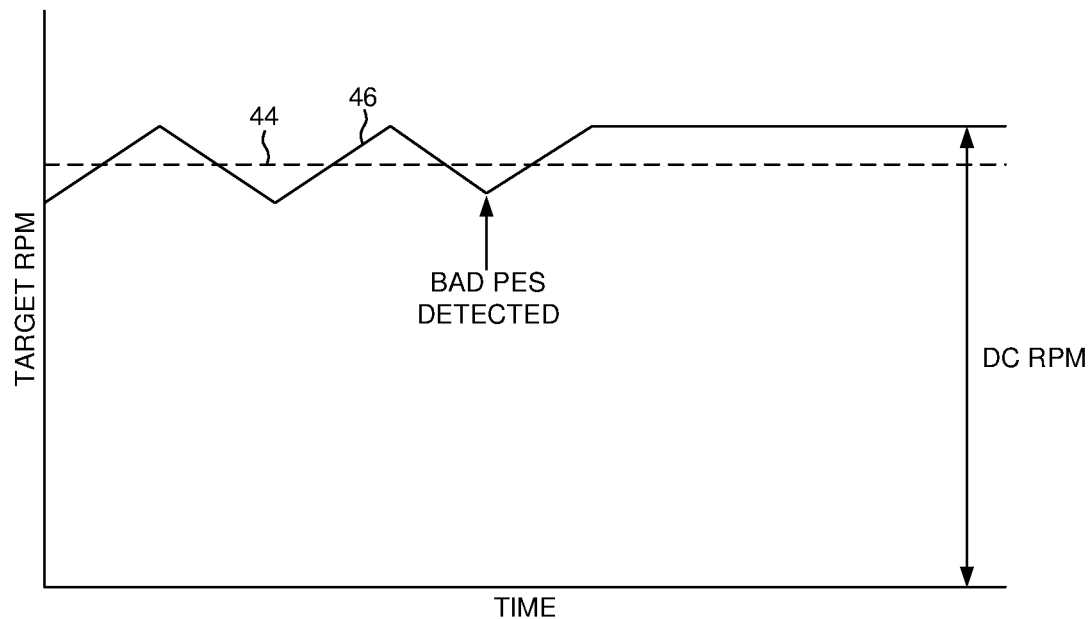
FIGS. 5A and 5B show an embodiment wherein when a bad PES disables the swing (AC) speed, the target speed is ramped adjusted to a maximum or minimum of the swing speed depending on the level of the swing speed when the bad PES is detected.
Figure 5B:
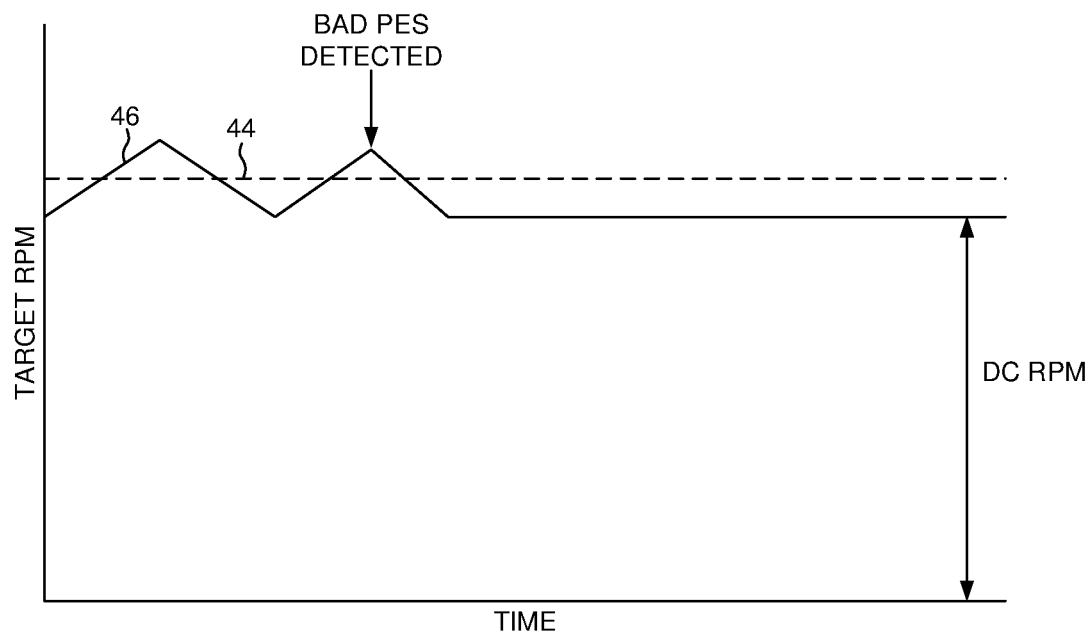

FIGS. 5A and 5B show an embodiment wherein when a bad PES is detected, the target speed is adjusted to the maximum or minimum of the swing target speed. In the example of FIG. 5A, if a bad PES is detected during the negative phase of the swing (AC) speed, the target DC speed is adjusted to the maximum swing target speed (peak of the triangle wave in this embodiment). The target speed is also ramped to the target DC speed in this embodiment to avoid injecting a transient disturbance. Conversely as shown in the example of FIG. 5B, if a bad PES is detected during the positive phase of the swing (AC) speed, the target DC speed is adjusted to the minimum of the swing target speed (valley of the triangle wave in this embodiment). In this manner, when a bad PES is detected the target speed of the spindle motor is moved away from the target speed that caused the bad PES (i.e., moved away from the mechanical mode that magnified the NRRO disturbance).

Figure 6:
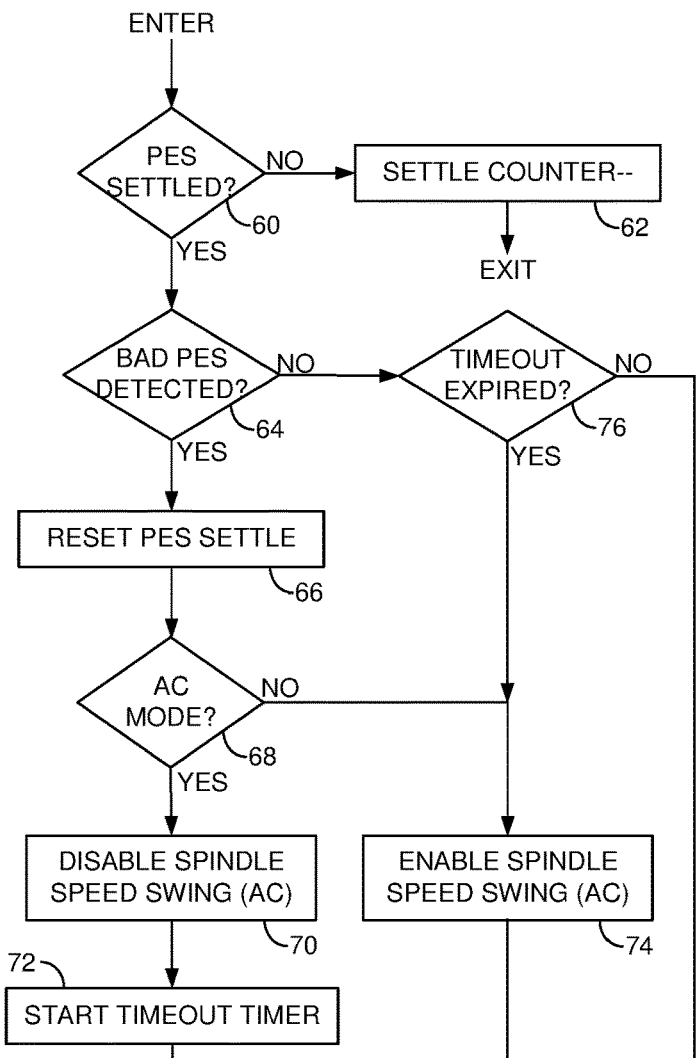
FIG. 6 is a flow diagram according to an embodiment wherein when a bad PES is detected, the spindle speed control is toggled between the AC and DC mode.

FIG. 6 is a flow diagram according to an embodiment that may be executed periodically, such as when processing a servo sector to generate a new PES, to determine whether to disable/enable swinging of the spindle motor speed. During certain modes, the PES may be settling, such as at the end of a seek operation or after switching between the spindle speed control modes. Accordingly a check is made at block 60 to determine whether the PES has settled, which in one embodiment is based on a counter. If the PES has not settled, a settle counter is decremented (block 62). If the PES has settled at block 60, a determination is made as to whether a bad PES is detected at block 64 (e.g., by comparing the variance of the band-pass filtered PES to a threshold as in FIG. 4A). When a bad PES is detected (block 64), the PES settle counter is reset (block 66), and when the spindle speed control is in the AC mode (block 68), the swing (AC) speed of the spindle motor is disabled (block 70) and a timeout timer is started (block 72). When the spindle speed control is in the DC mode at block 68, the swing (AC) speed of the spindle motor is enabled (block 74) as in the above described embodiments. If a bad PES is not detected at block 64, and the DC mode timeout timer (started at block 72) times out at block 76, the swing (AC) speed of the spindle motor is enabled (block 74). Accordingly in this embodiment, the spindle speed control may toggle from the DC mode to the AC mode when a bad PES is detected, or when a timeout timer expires after switching to the DC mode (i.e., the AC mode is the default mode in this embodiment).

Referring again to the embodiment of FIG. 4A, the band-pass filter 50 and/or the variance calculator 52 may operate over any suitable window of PES samples. For example, in one embodiment the window may be defined over a percentage (e.g., ten percent) of the total number of servo sectors recorded around the circumference of the disk. In another embodiment, the frequency range(s) of the band-pass filter 50 may be adjusted based on the mode (AC or DC) of the spindle speed control. For example, when the spindle speed control switches from the AC to DC mode, the band-pass filter 50 may be adjusted to extract frequencies of the PES that correspond to the RRO disturbance caused by the spindle motor 20. In other embodiments, the threshold 54 in FIG. 4A for detecting a bad PES variance may be adjusted based on the mode of the spindle speed control. In other yet embodiments, statistical properties in addition to (or other than) a variance may be computed and used to transition between the spindle speed control modes.

Figure 7:
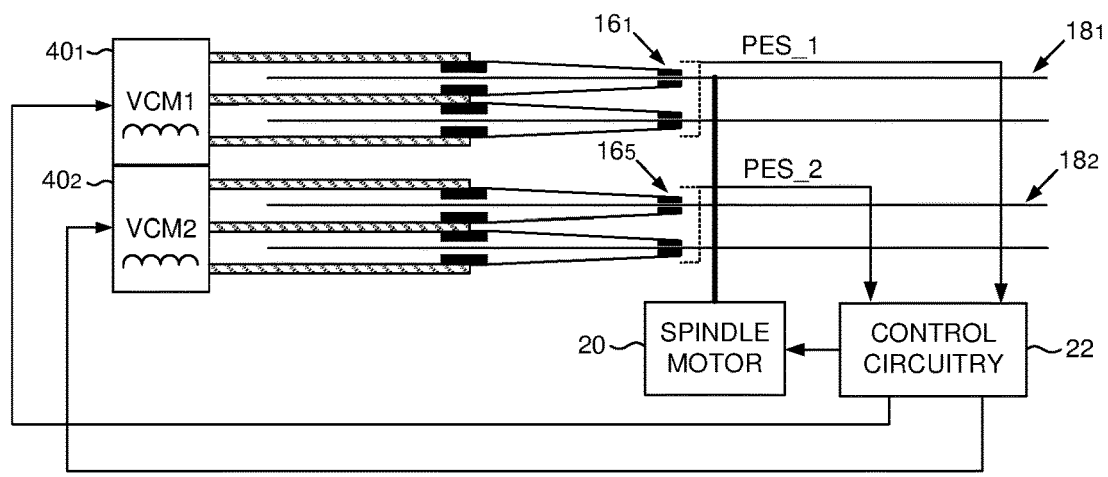
FIG. 7 shows an embodiment wherein the disk drive employs multiple head actuators such that a bad PES detected from any one of the actuated heads causes the spindle speed control to toggle between the AC and DC mode.

In one embodiment, the disk drive may comprise multiple actuators such as the split actuator design shown in FIG. 7 wherein first and second VCMs 40₁ and 40₂ actuate a first and second set of actuator arms about a common pivot. In another embodiment, multiple VCMs may actuate a respective set of actuator arms about independent pivots. In one embodiment, the control circuitry 22 may process the PES generated by an active head from each set of actuator arms (actuated by the first and second VCMs 40₁ and 40₂), and when a bad PES from either set of heads is detected, the control circuitry 22 may toggle the spindle speed control between the AC and DC modes as described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising servo data;
   a spindle motor configured to rotate the disk;
   a head actuated over the disk; and
   control circuitry configured to:
      generate a position error signal (PES) based on the servo data;
      actuate the head over the disk based on the PES;
      swing a speed of the spindle motor; and
      disable the swinging based on the PES.

2. The data storage device as recited in claim 1, wherein the control circuitry is further configured to:
   compute a variance signal based on the PES; and
   disable the swinging when the variance signal rises above a threshold.

3. The data storage device as recited in claim 2, wherein the control circuitry is further configured to:
   band-pass filter the PES to generate a band-pass PES; and
   compute the variance signal based on the band-pass PES.

4. The data storage device as recited in claim 2, wherein after the variance signal falls below the threshold, the control circuitry is further configured to re-enable the swinging when the variance signal again rises above the threshold.

5. The data storage device as recited in claim 2, wherein after the variance signal falls below the threshold, the control circuitry is further configured to re-enable the swinging after a predetermined timeout interval.

6. The data storage device as recited in claim 1, wherein the control circuitry is further configured to swing the speed of the spindle motor by generating a target speed consisting of a DC component and an AC component.

7. The data storage device as recited in claim 6, wherein the AC component consists of a triangle waveform.

8. The data storage device as recited in claim 6, wherein the control circuitry is further configured to disable the swinging by:
   disabling the AC component; and
   adjust the DC component to either a maximum of the swing target speed or a minimum of the swing target speed.

9. A data storage device comprising:
   a disk comprising servo data;
   a spindle motor configured to rotate the disk;
   a head actuated over the disk; and
   control circuitry configured to:
      generate a position error signal (PES) based on the servo data;
      actuate the head over the disk based on the PES;
      generate a target speed consisting of a DC component plus an AC component;
      control a speed of the spindle motor based on the target speed; and
      disable the AC component of the target speed based on the PES.

10. The data storage device as recited in claim 9, wherein the control circuitry is further configured to:
    compute a variance signal based on the PES; and
    disable the AC component when the variance signal rises above a threshold.

11. The data storage device as recited in claim 10, wherein the control circuitry is further configured to:
    band-pass filter the PES to generate a band-pass PES; and
    compute the variance signal based on the band-pass PES.

12. The data storage device as recited in claim 10, wherein after the variance signal falls below the threshold, the control circuitry is further configured to re-enable the AC component when the variance signal again rises above the threshold.

13. The data storage device as recited in claim 10, wherein after the variance signal falls below the threshold, the control circuitry is further configured to re-enable the AC component after a predetermined timeout interval.

14. The data storage device as recited in claim 9, wherein the AC component consists of a triangle waveform.

15. The data storage device as recited in claim 9, wherein when disabling the AC component the control circuitry is further configured to adjust the DC component to either a maximum of the DC+AC target speed or a minimum of the DC+AC target speed.

16. A data storage device comprising:
a disk comprising servo data;
a spindle motor configured to rotate the disk;
a head actuated over the disk;
a means for generating a position error signal (PES) based on the servo data;
a means for actuating the head over the disk based on the PES;
a means for swinging a target speed of the spindle motor; and
a means for disabling the swinging based on the PES.

17. The data storage device as recited in claim 16, wherein the means for disabling the swinging comprises a means for disabling an AC component of the target speed of the spindle motor.

18. The data storage device as recited in claim 17, wherein the AC component consists of a triangle waveform.

19. The data storage device as recited in claim 17, further comprising a means for adjusting a DC component of the target speed to either a maximum of the swing target speed or a minimum of the swing target speed.

* * * * *